Dec. 22, 1970 D. SILVERMAN 3,550,085

INFORMATION SYSTEM USING ARRAYS OF MULTIPLE SPOT PATTERNS

Filed Jan. 30, 1967 4 Sheets-Sheet 1

Daniel Silverman INVENTOR.

INVENTOR.
Daniel Silverman

Dec. 22, 1970 D. SILVERMAN 3,550,085

INFORMATION SYSTEM USING ARRAYS OF MULTIPLE SPOT PATTERNS

Filed Jan. 30, 1967 4 Sheets-Sheet 3

Daniel Silverman INVENTOR.

INVENTOR.

Daniel Silverman

United States Patent Office 3,550,085

Patented Dec. 22, 1970

3,550,085

INFORMATION SYSTEM USING ARRAYS OF MULTIPLE SPOT PATTERNS

Daniel Silverman, 5969 S. Birmingham, Tulsa, Okla. 74105

Continuation-in-part of applications Ser. No. 462,679, June 9, 1965, now Patent No. 3,322,033, and Ser. No. 514,311, Dec. 16, 1965, now Patent No. 3,333,239. This application Jan. 30, 1967, Ser. No. 612,698

Int. Cl. G06k *7/14;* G11b *5/06, 7/00*

U.S. Cl. 340—146.3 26 Claims

ABSTRACT OF THE DISCLOSURE

In this information system a record medium is used on which the information is recorded in the form of one or more parallel tracks or arrays of spot patterns. The patterns themselves comprise a plurality of short lines, bars, or spots arranged in a unique space pattern grouping or configuration that can be recognized in the reproducing or reading operation. Each pattern represents a digital bit. The longitudinal spacing of the patterns along the array is less than the total length of an individual pattern, so that there is overlapping between successive patterns. Successive patterns can be of the same or different configurations as the preceding patterns.

The patterns are read and detected by correlation or matched filtering with a facsimile of the recorded pattern. The spots in the pattern can be matched simultaneously, or sequentially. The record can be graphic and read optically, or it can be magnetic. If graphic, the record can be read by moving the medium past a reading spot, or spots of light or by moving a spot of light over the medium.

CROSS REFERENCE TO RELATED APPLICATION

This application is a continuation in part of my copending application Ser. No. 462,679, now Pat. No. 3,322,033, filed June 9, 1965, entitled Method and Apparatus for Making and Scanning Spot Patterns, and of my copending application Ser. No. 514,311, filed Dec. 16, 1965, entitled Subsurface Signaling Technique, now Pat. No. 3,333,239.

BACKGROUND OF THE INVENTION

This invention is concerned with the recording and reproduction of information in digital form. More specifically, it is concerned with the recording of information in high density form, that is, with great numbers of bits per unit area of record medium. Moreover, it is concerned with the recording of information in a form such that it is relatively insensitive to dust, dirt, scratches or other blemishes, which, in conventional recording, tend to reduce the signal to noise ratio (*S/N* ratio) of the recording.

The present art involves the recording on photographic film of a high density matrix of bits. These bits can, for example, be opaque or translucent spots in a rectangular matrix of spots, or a single or multitrack array of collums of spots. Such systems are described in my patents U.S. No. 2,820,907, entitled Microfilm Apparatus, issued Jan. 21, 1958; U.S. No. 3,158,846, entitled Information Retrieval Systems, issued Nov. 24, 1964; and U.S. No. 3,179,001, entitled Method and Apparatus for Storing on and Retrieving Information From Multiple Information Strips.

These forms of digital record are very useful, and provide a high density, high *S/N* ratio recording when the records are kept clean and free of dust, scratches, and other blemishes. However, when a particle of dust covers one or more bits in the matrix, an error is introduced into the reading of the information and it becomes necessary to provide multiple spots per bit, or redundancy in the recording, with a consequent reduction in the density of useful bits of information.

It is, therefore, an important object of this invention to provide a recording system for digital information that has high density, high integrity (or permanence) and low sensitivity to degradation by dust or blemishes.

This object is accomplished by recording a bit of information in the form of a spot pattern of a particular kind. These patterns cover a much larger area of the record than a single spot in the conventional system. Thus, a small speck of dust which might completely mask a spot (and therefore, a bit) in the conventional systems, can only cover a small fraction of the area of a bit record in my system. The bit pattern is chosen so that if part of it is degraded or lost, the remaining part will deliver the same information but at a lower *S/N* ratio. Furthermore, successive bit patterns in my system can overlap other bit patterns and still be separately recognized in the reading step. Thus an equal density of recording can be provided with a higher effective *S/N* ratio than in the conventional system.

One type of pattern of spots might be a chirp signal or swept frequency signal. This is a signal having a multiplicity of cycles varying in frequency from a lower frequency to a higher frequency. However, there are other types of multispot patterns that can be used. This signal is detected by correlation or by the use of an optical matched filter.

SUMMARY OF THE INVENTION

In the conventional information system the recorded form of the information bits are spots of a dimension of the order of possible blemishes on the record. There is danger that a blemish may occur and cover one or more recorded bits, the information from which may thereby be lost. However, in accordance with this invention, the recorded form of a unit or bit of information is not a single spot, but is a pattern of spots. The size of the pattern is many times larger than the conventional information bit. Because of the larger size, the interference from blemishes is minimized. The particular pattern chosen permits detection and recognition even if part of the pattern is covered by a blemish. The high density of bit recording is obtained by overlapping a plurality of spaced patterns, which may be of the same or different spot configurations. The patterns are composed of spots which can be recorded and read simultaneously or sequentially, and the reading can search simultaneously for a plurality of pattern configurations, or for a single pattern configuration.

BRIEF DESCRIPTION OF THE DRAWINGS

These principles and their applications will be better understood by references to the accompanying drawings illustrating certain preferred and other embodiments of the invention.

In these drawings.

DESCRIPTION OF THE PREFERRRED EMBODIMENTS

Figure 1A:
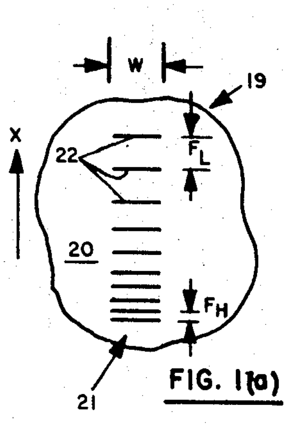
FIGS. 1*a* and 1*b* show portions, respectively, of a record and a reading mask showing a typical configuration of spots representing an information bit.

Referring now to the drawings and particularly to FIG. 1*a*, I show a portion 20 of a record medium on which is recorded a track 21 of spots 22. For convenience the track width is W, and the spots are short thin bars or lines perpendicular to the length of the track 21. The spacing of the bars 22 in the pattern is nonuniform, varying from a spacing $F_L$ at one end to a shorter spacing $F_H$ at the other end. These spacings can be described as a spatial period by analogy to time periods. The long space period $F_L$ corresponds to a low spatial frequency, and correspondingly, the short space period $F_H$ corresponds to a high space frequency. It is, therefore, seen that the pattern 19 of lines or bars comprises a space pattern signal of changing space frequency. This particular pattern is called a swept frequency pattern, indicating that the space frequency pattern changes as a function of distance, X. This function can be a linear or a nonlinear function.

Figure 1B:
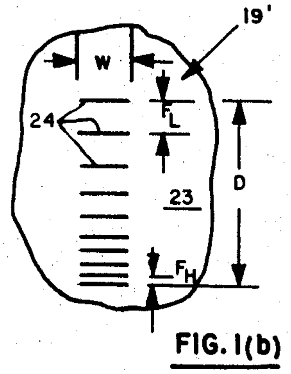

In FIG. 1*b*, I show as 23 a portion of an opaque mask which carries an identical pattern 19′ to that, 19, on the record medium 20. When the record and the mask are superimposed, the two patterns 19 and 19′ are in exact alignment. Possible means for placing the record and mask in alignment are indicated in U.S. Pat. #2,820,907.

Figure 2:
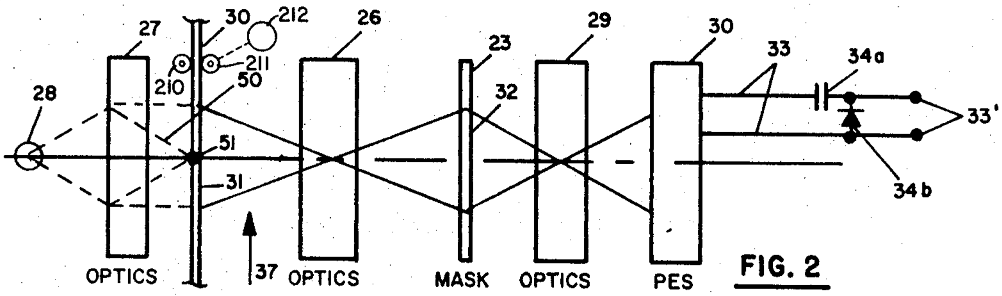
FIG. 2 represents schematically one embodiment of an apparatus for optically reading the record of FIG. 1*a*.

In FIG. 2, I show schematically an optical system comprising a light source 28 which irradiates the record 20 through optics 27. The portion 31 of the record includes the pattern 19. Consider that the pattern 19 on record 20 consists of translucent lines or bars on an opaque background. Then light from 28 will illuminate the translucent pattern, and this light passing through the record is imaged by optics 26 and will be projected onto mask 23, and particularly onto the portion 32 containing the pattern 19′. When the record and the mask are properly aligned, the image of pattern 19 on 20 will fall on top of pattern 19′ on 23, and light will shine through the mask, through optics 29 onto photoelectric sensor means (PES) 30 with output leads 33. The voltage output on leads 33 are a function of the total amount of light falling on the PES, and thus the total amount of light passing through both the record pattern and the mask pattern. The record 20 is traversed by conventional rollers 210, 211 and motor 212.

Figure 3A:
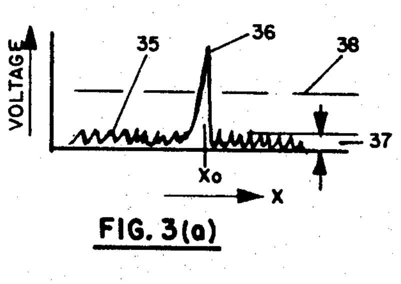
FIGS. 3*a* and 3*b* show the signal from the reader corresponding to a single pattern, before and after biasing.
Figure 3B:
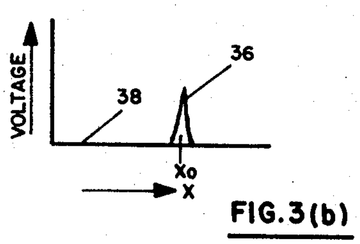

It will be clear that the light passing through pattern 19′ on mask 23 depends on the relative position of the record and the mask. As the record is traversed in the direction of the arrow 37, a varying amount of light will pass through the two patterns as lines or bars of the two patterns chance to line up with each other. This is shown in FIGS. 3*a* and 3*b* where I have plotted as 35 the voltage output of the PES 30 as a function of distance X that the record 20 moves with respect to the mask 23. However, when $X=X_0$, the position where the two patterns are in exact alignment, the light passing through the mask and the voltage on 33 is a maximum, 36. So long as the random variations of voltage 35 have an amplitude 37 which is small compared to the peak value 36, it is possible to provide a bias circuit comprising a bias battery **34*a* and rectifier 34*b* that applies a bias voltage 38 of magniture greater than 37 and less than 36, so that the voltage actually appearing at 33′ is zero at all times except when the peak of voltage 36** appears. This is shown in FIG. 3*b*.

The process of measuring the light passing through the two transparencies as one film is traversed past the other is a process of correlation of the two time functions representing the patterns on the record and on the mask. It can also be considered a process of matched filtering where the pattern of light passing through the record is compared or matched to the translucent pattern of the mask.

The process of correlation is a mathematical operation well known in the art. Reference is made to any good mathematical text book and to my Pat. No. 3,333,239.

The presence of the peak 36 is indication that the record 20 carries a pattern 19 that matches the pattern 19′ on the mask, and that the longitudinal position of the record is such that he two patterns are in coincidence.

The presence or absence of the peak 36 is then an indication of the presence or absence of the pattern 19, or in binary terms, an indication of the recording of a binary "1" or "0" on the record.

I have shown the record strip 20 moving past the optics 27 in the direction of the arrow 37. Although I have shown no means for traversing the strip it will be well known to the man skilled in the art that this can be accomplished by the use of a motor driven capstan and pressure roller, or similar means, such as is well known in the art of magnetic recorders and computers. In my U.S. Pats. No. 3,179,001 and No. 3,423,743, I show typical mechanisms of this type. A similar type of drive could of course be used in connection with FIG. 8, etc.

It is obvious that to use a length of record D for indication of a single bit, would be wasteful of space. So I contemplate superimposing a plurality of patterns 19, on the same track, each displaced by a distance *d*.

Figure 4A:
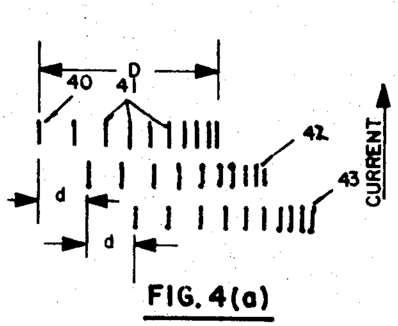
FIGS. 4*a* and 4*b* illustrate the recording of overlapping patterns and the output of the reader corresponding to three overlapping patterns.
Figure 4B:
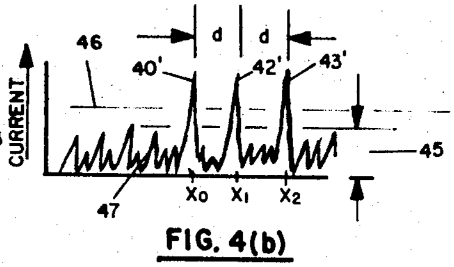

This is illustrated in FIG. 4*a* where I show (for convenience) three patterns 40, 42, 43, etc., all alike, and displaced in X (along the strip) by distances *d*. I show them side by side for clarity, although they would actually be superimposed on the track. The record can be constructed in a number of ways, one of which is to record each of the patterns on a film strip, by exposing one pattern, moving the strip a distance *d* exposing the second pattern, and so on. When this strip is developed, there will be a triple series of opaque lines or bars. Now, if a positive film is made of this, there will be an opaque strip with three sets of transparent bars. Since the superposition of a second transparent bar over a first transparent bar just adds transparency, each of the patterns can act independently of the others. Now, as the record with triple pattern is passed over the mask, the light passing through both film and mask, and the output voltage of 33 will be as shown in FIG. 4*b*. Here the random variations 47 of voltage are larger than in FIG. 3*a* since there are more transparent bars and so more opportunity for more chance lineups with the pattern 19′ of the mask. Also there will be three peaks 40′, 42′, and 43′, at positions $X_0$, $X_1$, $X_2$, each spaced apart a distance *d*. Therefore, even though the three patterns 40, 42, and 43, are superimposed, they do not interfere with each other, and each will record its true peak as though the others were not present. Of course with a larger amplitude 45 of the voltage 47, it may be necessary to use a different value of bias voltage 46 so as to record only the peaks without recording the varying voltage 47.

While I have shown a swept frequency signal pattern 19, there are other forms of signal which, in this type of optical filtering demonstrate a high peak value 36 and a low side lobe or random value 35. It is possible to vary the frequency limits and the duration D of the pattern so as to improve the sharpness, and ratio of peak to side lobes. Also it is possible to design the function in terms of the distance *d* by which the patterns will be displaced, so that the combined level 47 of side lobes will be low compared to peaks 40′, 42′, 43′, etc. Also, it is possible to have as many superimposed patterns as there are spaces *d* in D. It will be clear that the smaller *d*, the more patterns, and the more bits can be recorded on the track. Also, the greater D, the better the ratio of peak to side lobes. However, the greater $D/d$, the greater the amplitude 47 of the side lobes and the poorer the $S/N$ ratio. So some compromise must be worked out.

One of the features of the swept frequency pattern of FIG. 1*a* is that it completely matches at only one position with a similar pattern. So any configuration of lines or bars must preferably have this feature of uniqueness. This insures that there will only be a single large peak 36 and small side lobes when this pattern is correlated with itself. While the swept frequency or "chirp" pattern is a good one for this purpose, the type of pattern that can be used, can more generally be described as a "unique," nonuniformly-spaced pattern that can correlate with itself in only one position.

The real advantage of having a relatively long pattern 19 with a large ratio $D/d$ is that if a piece of dust, scratch, or other blemish should develop on the record, where the size of the blemish is greater than *d*, only a portion of the pattern 19 will be lost and the bit can still be read, whereas, the entire bit (in the conventional system) would be lost. The effect of an opaque blemish over the pattern 19 would be to reduce the size of the peak 36. The effect of a transparent blemish (a scratch in the opaque portion of the record) is to increase the level of the side lobes. Both of these types of blemishes reduce the peak-to-side-lobe ratio ($P/L$) and so diminish the quality of the record. However, this type of record can stand considerably more such blemishes and still be readable, than can the conventional dot pattern recordings.

In FIG. 2, I have shown a reading system for this type of record, in which the entire pattern 19 on the track 21 on the record 20 is imaged (as the record is traversed) onto the pattern 19′ on the mask 23. Thus the entire pattern 19 is compared optically at one time to the pattern 19′. It is, of course, possible to scan the pattern 19 with a point or line of light, such as the line 51 of FIG. 2 (shown as a point in this view) resulting from the focussing 50 of the optics 27.

Figures 5A, 5B:
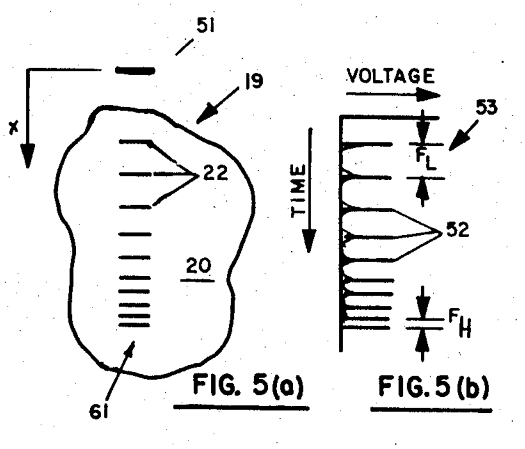
FIGS. 5*a* and 5*b* show the result of the sequential scanning of the pattern.

In FIG. 5*a*, I show a portion of the record 20. The pattern 19 comprises a plurality of translucent lines or bars 22 in a particular space pattern. The scanning line of light might be considered to be 51, which moves downward in accordance with displacement X, at uniform velocity. The output of the PES will be a voltage as shown in FIG. 5*b*, showing a pattern of voltage pulses 53 comprising spaced (in time) peaks 52.

Figure 5C:
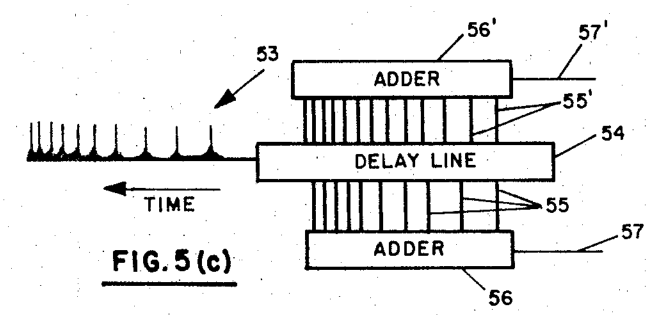
FIGS. 5*c* and 5*d* show the use of a delay line correlator to detect the output signal of the scanner of FIG. 5*a*, and the resulting signal output of the correlator.
Figure 5D:
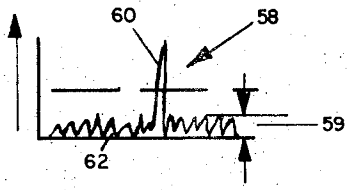

Having converted the space pattern 19 to a time pattern of voltage peaks 53, we need to provide an appropriate filter for this voltage signal 53, corresponding to the optical filter of FIG. 2. One such filter is illustrated in FIG. 5*c*. This comprises an electrical delay line 54 into which the signal 53 is introduced. At spaced points along the delay line are voltage taps 55. The particular points along the delay line where the taps are attached depends on the particular pattern 53 which is to be filtered. The taps are positioned such that at one instant of time, while the entire signal is in the delay line, a tap will be at the proper position to record each of the voltage pulses 52. If now the output voltages on each of the taps is added in adder 56, the output lead 57 will produce a voltage as shown in FIG. 5*d*. This is similar to the curve of FIG. 3*a*, except that it is a curve of voltage as a function of *time*, rather than a function of *distance*, where time represents the distance of movement of the record past the scanning line. Thus, when the pattern of the taps 55, the output 57 will be a maximum (peak 60). Before and after this time, the voltage will be an irregular series of pulses 62. So, a point (or line) scanner of the record pattern 19 and a delay line filter designed for the particular pattern of the signal 53 will give an output signal having a sharp peak of voltage corresponding to the time of passage of the record pattern.

In FIG. 5*c*, I show a second set of voltage taps 55′ from the delay line to a second adder 56′ having a voltage output 57′. So that the same delay line filter can be used to simultaneously detect two different patterns. Additional series of taps can be used, etc., to filter as many patterns simultaneously as desired.

Also, whereas in FIG. 4*a* and 4*b*, I showed the result of optically filtering the multiple pattern overlay of FIG. 4*a* to get the multiple peak voltage of FIG. 4*b*, if the multiple pattern overlay is scanned by a point or line, and the signal passed through the delay line filter, the voltage output 57 will be similar to FIG. 4*b*.

I have illustrated the principle of this invention in the form of a photographic record with a spaced pattern of narrow transverse lines or bars. This photographic pattern can be read or detected in two ways, that is, by an optical correlator or matched filter in which the entire pattern is imaged at one time onto the optical filter. Or the pattern on the record can be detected by being scanned or read point by point, the light intensity converted to electrical signals, and the electrical signals filtered in an electrical correlator or matched filter, such as the delay line filter illustrated. The record, can be a sheet with opaque and translucent areas through which light passes, or it can be a sheet or web with reflecting and nonreflecting areas. The record (of either of these types) can be prepared photographically, xerographically or electrographically, etc.

It will be clear also that the line or bar pattern can be formed on a magnetizeable sheet record, and the pattern can be read by passing the record over the narrow reading gap of a magnetic reading head. The voltage output of the head will then be similar to the voltage pattern 53 of FIG. 5*b*. This signal passed into the delay line filter of FIG. 5*c* will produce the output signal 60, 62, of FIG. 5*d*. Furthermore, with magnetic recording, the output corresponding to superimposed pattern similar to FIG. 4*a* will produce at the output of the delay line filter a voltage similar to that of FIG. 4*b*.

Figures 6, 8:
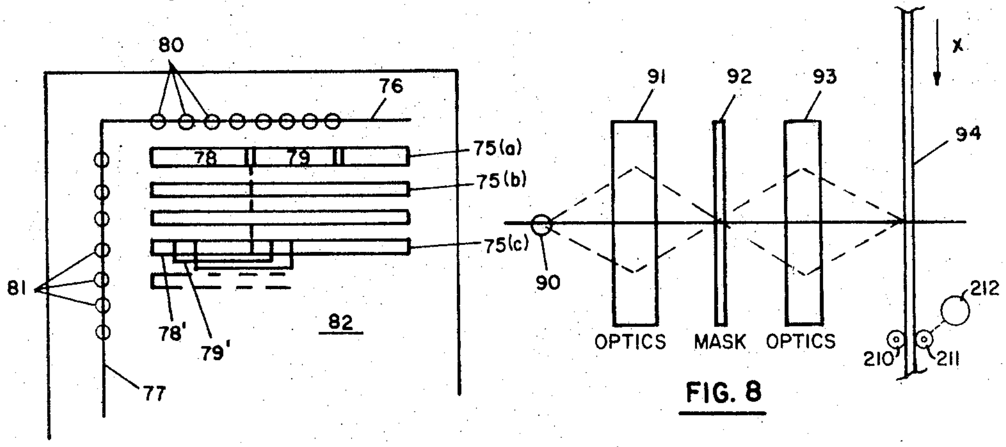
FIG. 6 shows a type of information record that is read while stationary by a moving spot of light.
FIG. 8 illustrates one type of recording apparatus in which a complete bit pattern is recorded photographically at one time.

Let us return to the case of photographic recording and the use of a spot or line scanner as in FIG. 5. Now instead of moving the record and keeping the spot fixed as in FIG. 2, we can keep the record fixed and move the spot. Consider a record 82 such as shown in FIG. 6. Here are a plurality of horizontal rows 75 (or tracks) along which are recorded patterns comprising a plurality of lines or bars similar to those of FIG. 5*a*. These patterns might be as indicated by 78, 79, etc., as rectangles along the track 75*a*. This would be similar to the track 61 of the record 20 of FIG. 5*a*. Or they might be in the form of superimposed patterns such as 78′, 79′, etc., on track 75*c*. On two perpendicular sides of this record of tracks 75 are rows 76, 77, of index areas 80, 81. These are guide indicia for control of the scanning spot. The areas 81 mark the positions of each of the tracks 75, while the areas 80 may mark the position of each superimposed pattern 78′, 79′, etc., on the tracks 75.

Figure 7:
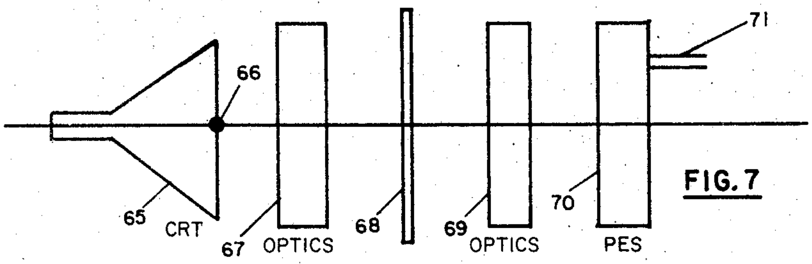
FIG. 7 shows a type of record reader that can read a record of the type of FIG. 6.

This record can be read in an apparatus such as that shown schematically in FIG. 7. Here I show a cathode ray tube (CRT) 65 with luminous spot 66 on the front face. By control of deflection means, the beam producing this spot can be deflected up and down and across the CRT face to scan the spot along each of the tracks 75 and guide indicia. This type of CRT control (known as the flying spot scanner) is well known in the art, and the circuits need not be described further at this time.

The spot 66 is imaged by optics 67 onto record 68. The record, similar to 200 of FIG. 5*a* has translucent lines on an opaque background. The light that shines through a translucent line is then imaged by optics 69 onto PES means 70 where the light variations are converted to electrical voltage variations appearing on leads 71. Thus, as the flying spot is traced along track 75*a*, voltage patterns similar to 52 of FIG. 5*b* will be formed, which can then be filtered with the electrical matched filter of FIG. 5*c*, etc.

Thus, this information system can be applied to a strip optical record with optical pattern filtering. Also by the use of a point source of light (and either transmission through or reflection from the record), while moving the strip, and an electrical filter, the record can be read. The light spot can be stationary and the record moved, or the record can be stationary and the light spot moved. The light used can, of course, be of any desired wavelength for which the PES is sensitive.

We will now consider how this information record can be made. In FIG. 8, I show schematically a photographic apparatus for recording the patterns on the recorded medium. A light source 90 is collimated by optics 91 to illuminate a mask or standard 92. This mask is an opaque sheet as in FIG. 1*b* with a pattern 19′ or equivalent pattern of translucent points, bars, or lines 24 in proper spacing. This illuminated pattern on 92 is imaged by optics 93 onto unexposed photographic material 94. As indicated above, this can be a film or a paper, adapted to be read respectively by transmitting or reflecting light. Consider that 94 is a film. After the exposure of the image 92 is made, the film is advanced a distance *d* by means of conventional rollers 210, 211 and motor 212, and a second exposure made by control of light source 90, and so on. Of course, since the presence of a pattern represents a binary "1" and the absence means a binary "0," as the strip is advanced in each case by the distance *d*, the pattren is re-exposed or not exposed, depending on whether a "1" or a "0" is to be recorded.

While it is possible to record a binary "1" or "0" by recording or not recording the pattern, it is also possible to record a binary "1" by recording a first pattern, and to record a binary "0" by recording a second, different pattern, and so on.

Figures 9, 12:
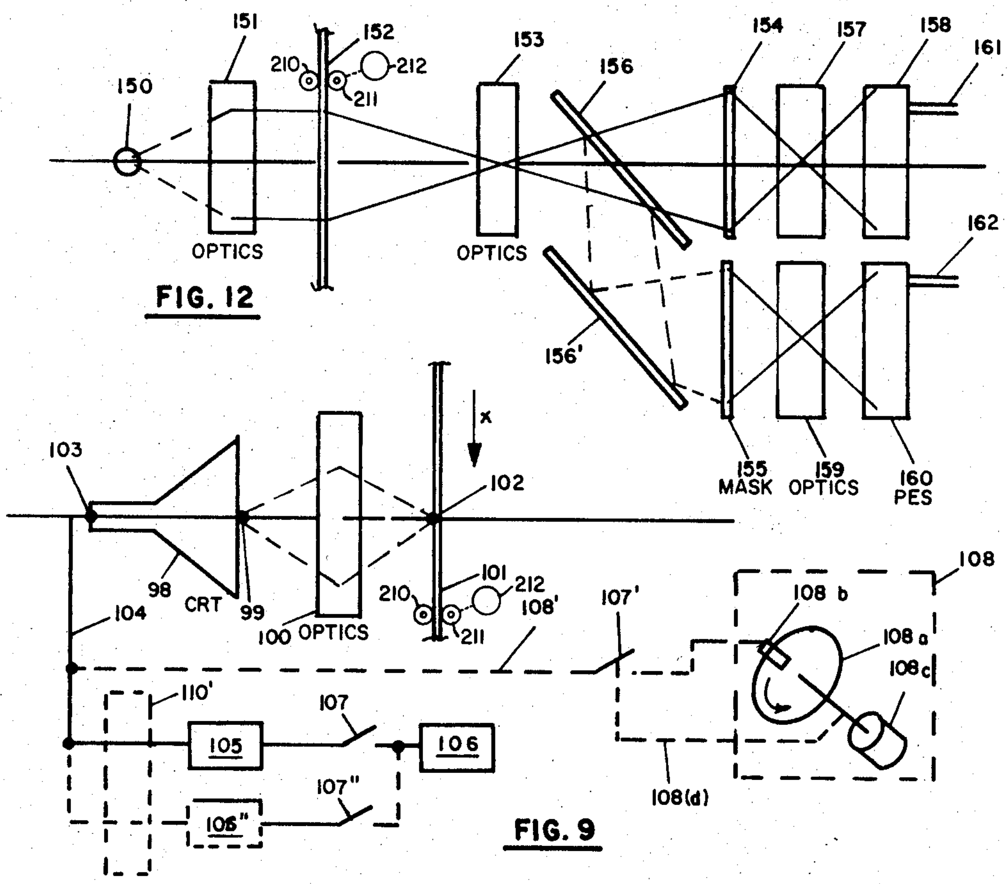
FIG. 9 illustrates a recording apparatus in which the bit pattern is written one spot at a time while the recording medium is moving.
FIG. 12 illustrates an embodiment in which the record is simultaneously scanned for two different patterns.

It is possible also to record the pattern 19′ sequentially rather than simultaneously as in FIG. 8. In FIG. 9, I show schematically one way of doing this. A cathode ray tube 98 (or other type of controllable luminous spot source such as a glow tube) with its spot 99 is imaged by optics 100 onto point 102 on the film 101. The film is moving at a constant rate past the point 102 driven by conventional rollers 210, 211 and motor 212. When a pattern is to be recorded, a signal coresponding to the electrical pattern signal 53 of FIG. 5*b*, for example, is applied to the Z axis brightening lead 103 of the CRT over lead 104. I have shown by box 105 a source of such a pattern signal. This can be a circuit for which the impulse response is the desired pattern. This source can be an electrical network which will produce an appropriate analog signal (like 53) whenever a pulse of voltage is applied to it, such as from voltage source 106, through switch 107. Alternatively, (as shown by the dashed lines 108′) box 108 can contain a rotating magnetic disc or drum 108*a* on which the pattern 53 is recorded, and from which it is read by a magnetic head 108*b* (as is well known in the art). The recording is analog and the signal repeats itself continuously as the disc is rotated by motor 108*a*. The switch 107′ is synchronized with the repeating pattern on the disc by means shown schematically as 108*d* and well known in the art, so that when switch 107′ is closed, the pattern signal is applied to terminal 103 of CRT 98 and the luminosity of spot 102 follows the signal 53 and records the same on the strip 101. Of course, by this simple apparatus it is not possible to overlap the patterns on the record.

In FIG. 9, I show by the dashed outlines 105″ and 107″ a second voltage generator and switch, like 105 and 107. The generator 105″ is designed to provide a different pattern of pulses from that provided by 105. So by choosing which switch 107 or 107″ to close, we can get one or the other of the two patterns. Or, by closing both switches 107 and 107″ and using an adder 110″ we can record both patterns simultaneously.

Figure 10:
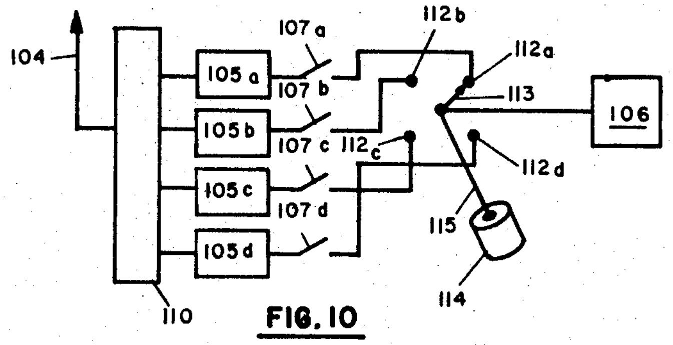
FIG. 10 illustrates a modification of FIG. 9 to record overlapping bit patterns.

The apparatus shown schematically in FIG. 10 will provide overlapping signals. This circuit utilizes a plurality of the signal generators 105 of FIG. 9. The outputs of the plurality of generators 105 go to adder circuit 110, the output of which goes by lead 104 to the CRT. A source of voltage 106 is connected to switch arm 113 of switch 111 which is driven sequentially over a plurality of contacts 112 connected respectively to each of the generators 105 through switches 107.

The time of travel of arm 113 between each contact 112 is the time it takes for strip 101 to go a distance *d* between overlapped patterns. As the switch arm 113 advances, a new pattern signal is generated first in 105*a*, then in 105*b*, etc. Signal 105*b* starts before 105*a* has finished, so adder 110 combines the two and the composite signal is fed to the CRT. If at each interval *d* a "1" is to be recorded, the appropriate switch 107 is closed. If an "0" is to be recorded, the appropriate switch 107 is left open.

Consider that a signal pattern "1101" is to be recorded. As the switch arm 13 contacts 112*a*, switch 107*a* is closed, generator 105*a* starts its signal pattern which begins to be recorded on strip 101. Then when switch arm 113 reaches 112*b*, switch 107*b* is closed and the signal from 105*b* is added to that of 105*a* in the output of adder 110. The signal that is recorded is now the sum of the two signals. Next, when arm 113 reaches 112*c*, since an "0" is to be recorded, switch 107*c* is left open. Then when arm 13 reaches 112*d*, switch 107*d* is closed, and so on.

If D is the space duration of the analog signal 53 on the record and *d* is the spacing between overlapped patterns, then there are a possible $D/d=k$ separate patterns overlapped on the record. There as also *k* separate generators 105, switches 107 and switch contact points 112. Then by the time switch arm 113 makes one complete set of contacts and returns again to 112, the signal generated by 105*a* has ended (although other signals may still be recording), and switch 107*a* has opened up and conditions are ready for 105*a* to continue recording patterns.

Figure 11:
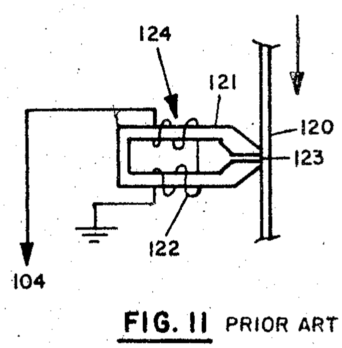
FIG. 11 PRIOR ART
FIG. 11 illustrates an apparatus for recording and reading a pattern on a magnetically sensitive record medium.

It will be clear that the signal output of adder 110 to lead 104 can go to a photo-optical recorder as shown in FIG. 9. However, it can also go to other types of point recorders, such as the magnetic recording head 124 of FIG. 11. Here I show a core structure 121, winding 122 and magnetizeable strip 120 passing the gap 123. It will be clear that FIG. 11 is included for purpose of illustration and the design shown and described is well known in the art and is not a part of this invention. So by means of apparatus similar or equivalent to that of FIG. 10, I contemplate recording on a magnetic material such as sheet or strip. It will be clear also that the recording head 124 will "read" the signal record 120, and will produce a voltage on the output coil 122 when the recorded record medium 130 is moved past the gap 123. This output will be similar to the signal originally recorded, and in the case discussed, this will be the output of adder 10.

In FIG. 2, I showed schematically an apparatus by means of which an image of the patttern on record 20 could be superimposed on the mask 23 so that a comparison could be made of the two patterns. In FIG. 12, I have expanded this system to include two masks 154, 155. The optical beam imaged from the record 152 by optics 153 is split by a partially silvered mirror 156, and part of the energy directed to and reflected by another mirror 15' to mask 155. So the same pattern on 152 can be simultaneously compared with two pattern masks. The outputs of the PES 158, 160 appearing on output leads 161, 162, tell whether the respective patterns are present, or not, on th e record. Of course, more than two masks 154, 155 can be provided by extending this optical principle. This permits increasing the density of recording of information by the added variable of the particular pattern recorded. Thus we can get 4 bits of information instead of two, for each pattern position on the record, namely a "1" or "0" for each of the two patterns, and so on. The record is traversed by conventional rollers 210, 211 and motor 212.

Figure 13:
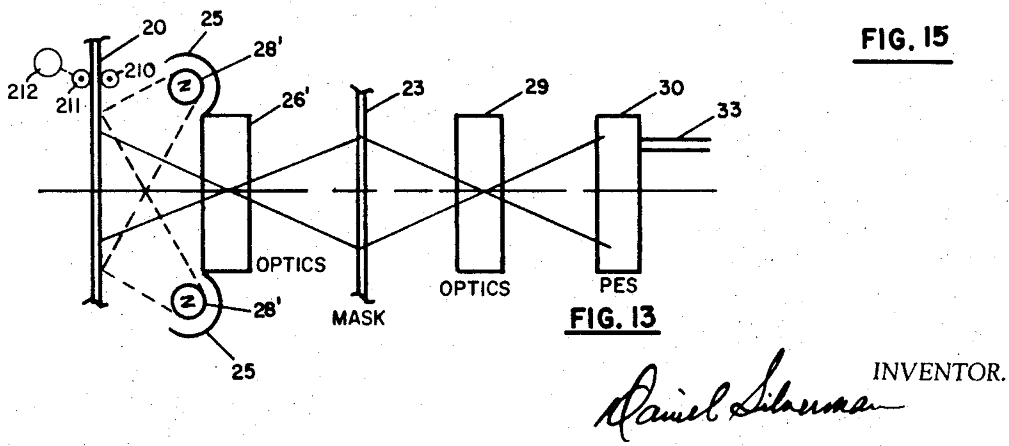
FIG. 13 illustrates an apparatus for reading an information record by reflected light.

As pointed out above, the pattern 19 can be recorded on a transparent film, to be read by transmitted light, or it can be recorded on an opaque sheet, and be read by reflected light. In FIG. 13, I show a system for doing this. It differs from FIG. 2 mainly in having the record 20 front-lighted instead of back-lighted. This is done by lamps 28' with appropriate reflectors 25. This illuminated surface is imaged by optics 26' onto mask 23 and the rest of the system is similar to FIG. 2. This system can be modified in accordance with FIG. 12 to simultaneously filter the pattern on record 20 with two or more optical matched filters. The record is traversed by conventional rollers 210, 211 and motor 212.

Figure 14:
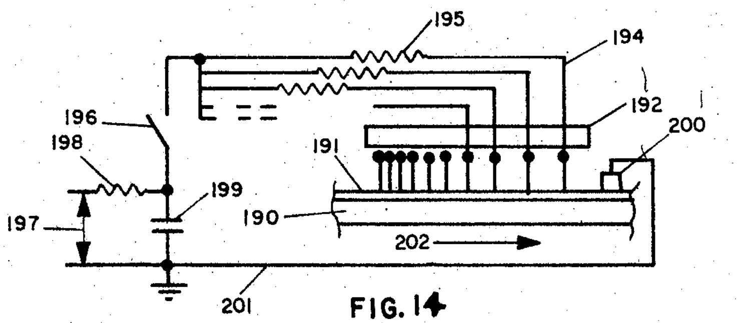
FIG. 14 illustrates an electrographic recording method.

While I have illustrated this system with the use of a photographic recording medium, this is soley for convenience since there are many other ways of preparing a graphic record well known in the art. For example, I show in FIG. 14 a portion of a record medium 189 that can be a transparent plastic sheet 190. A thin layer 191 of metal is formed on the surface of the plastic sheet. A plurality of sharp-pointed metal contacts 193 are held in an insulating frame 192 so that they contact the metal layer. Each of the contacts 193 is connected by a resistance 195 to a high potential through a switch 196. This circuit comprises a high voltage source 197 which charges a condenser 199 through a series resistance 198. When the condenser is charged and the switch 196 is closed, current passes through resistances 195 in parallel to each of the points. Current flows from the points, through the metal layer 191 to contact 200 and back to condenser 199 through lead 201. The current density at each of the points is sufficient to burn away the thin metal layer at each point, forming a spaced pattern of transparent spots. The pattern of spots is, of course, the pattern corresponding to the spacing of the points, which can be the same as that of FIG. 1. By using a short chisel point on the wires, a pattern of short translucent bars will be formed, etc.

Instead of feeding all wires in parallel, a single wire can be used and by moving the strip, say in the direction of the arrow 202, and spacing the operations of switch 196 in proper time, corresponding to the voltage pattern of FIG. 5, the desired pattern will be recorded.

If the record medium 190 is different, say, similar to facsimile papers, such as Teledeltos paper manufactured by the Western Union Company, New York, N.Y., the electrical currents from the wires 193 will print dark spots on the light colored surface of the record medium. So we can get transparent spots on an opaque sheet, or vice versa. It is also possible to use the well know xerographic process to record an optical pattern on a sheet of treated paper, such as zinc oxide coated paper, for example, and so one.

In my U.S. Pat. No. 3,158,846, I show means in FIGS. 1 and 3 for reading single track information record, or a multitrack information record, where the record strip, while moving longitudinally past recording means, has fredom to move laterally a distance greater than the track width. In the normal track reading system, the track may move off the reading head and no signal is read, or the track may move to a second reading head, in which case the wrong track is being read by that head. I show how it is possible to overcome this difficulty by (1) using a control track (2) with control detectors and control means, and (3) signal detectors and switch means in each information detector circuit, and (4) operation of said switch means by said control means.

Figure 15:
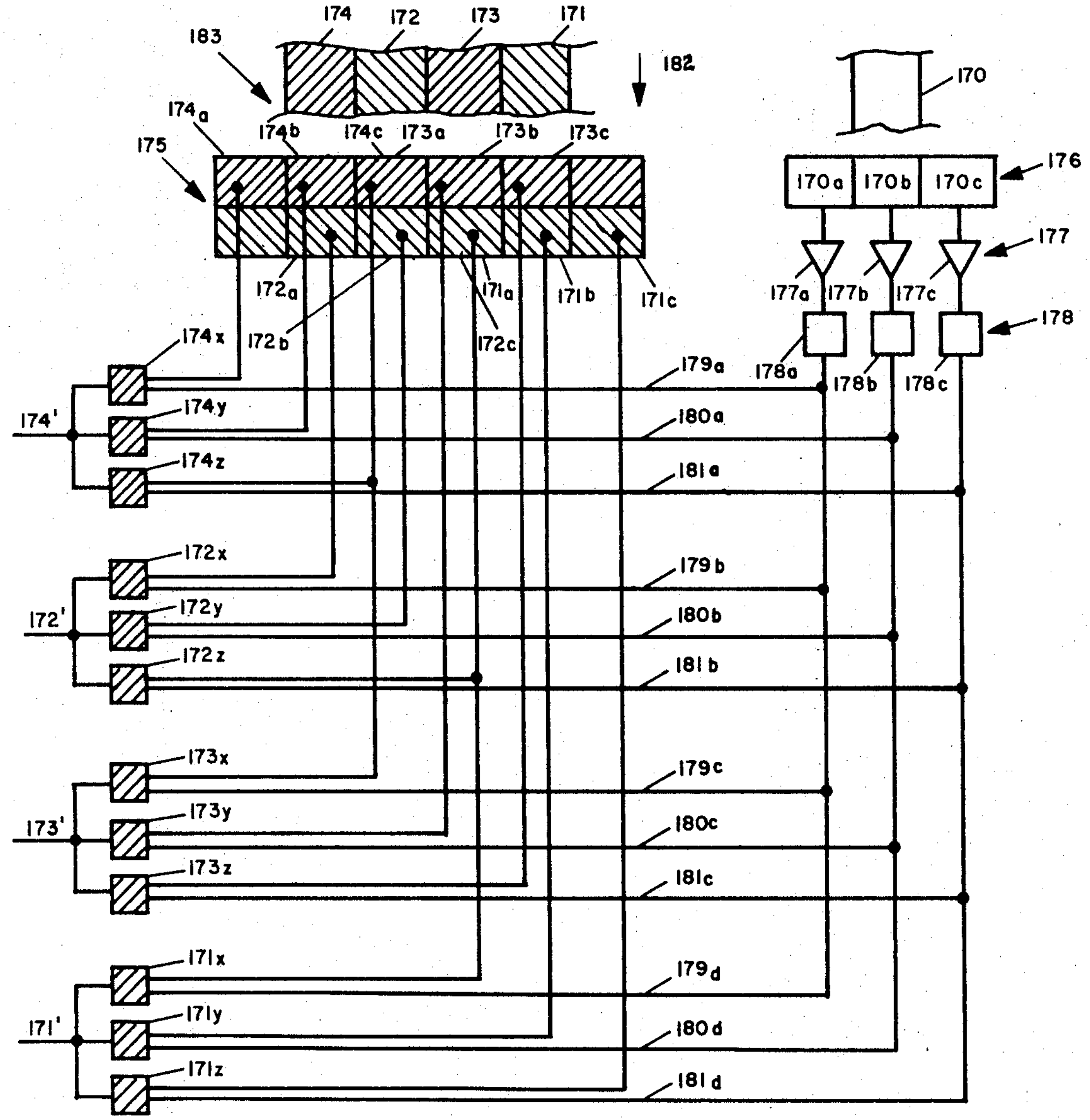
FIG. 15 illustrates an information record and reading system in which contiguous parallel arrays of bit patterns can be read irrespective of lateral movement of the record medium.

I show an information system in FIG. 15 which is based on FIGS. 1 and 3 of U.S. Pat. #3,158,846, but which can do more than shown in those figures. In FIG. 15, I show a portion of a record strip 183 moving in the direction 182 past a transverse array 175 of detectors. On the strip is recorded a plurality of tracks of information 171, 172, 173, 174, each of which might be similar to track 21 of FIG. 1*a* with single or overlapped patterns. The signal patterns on track 171 and 172 are alike, while on the intermediate contiguous tracks 173, 174, the signal pattern is different. Opposite each track is a pair of optical pattern filters similar to those shown in FIG. 12. Thus, depending on which track is imaged on the pair of filters, one or the other, or both will provide an appropriate signal output.

On the same strip, displaced from and parallel to tracks 171–174 is a guide, reference or control track 170. The signal on track 170 can be similar to either of the signals on tracks 171–174, or different. There is also an array of control detectors 176, with amplifiers 177 and controls 178 in the output lines of the detectors. The purpose of the controls 178 is to determine the relative position of track 170 with respect to detectors **170*a*, 170*b*, 170*c*, and therefore, the same relative position of tracks 171–174 with respect to their detectors. The outputs of the pairs of filters opposite each track are connected, as shown, to four groups of three switches each, 174X, 174Y, 174Z; 173X, 173Y, 173Z, etc. And the controls 178 are connected by leads 179, 180, 181, etc., to each of the switches (or relays). Thus the controls 178 getting their information from track 170 do the switching of the outputs of tracks 171–174 so that, for example, no matter which detector track 172 is opposite, that is, 172*a*, 172*b*, 172*c*, the control will determine where its output should be switched. For example, detecor 171*a* is the same as 172*c*. Its output is switched from 172Z to 171Z depending on whether it is reading track 172 or 171. And this is determined from the position of track 170.**

In FIG. 3 of U.S. No. 158,846, I show spaces between the tracks equal to the width of the tracks themselves. This is necessary to keep one track from recording on a more than two detectors. However, by using a different pattern of signals on the intermediate tracks, and using parallel filters on the detectors, the density of information recorded on the record can be doubled. Since this type of information system is fully described in U.S. Pat. No. 3,158,846, it is not deemed necessary to describe this embodiment further at this time.

It is, of course, possible to use magnetic recording on the record and to apply a different signal to alternate traces. Then by the use of filters such as shown in FIG. 5*c* the two signals can be separated and separately switched to their proper output lines.

While I have described my invention with reference to the foregoing specific embodiments and illustrations, it will be apparent to those skilled in the art that there are still further modifications and embodiments which can utilize the principles set forth.

The scope of the invention, therefore, should not be considered as limited to the details of described embodiments, but it is properly to be ascertained from the scope of the appended claims.

I claim:

1. An information system comprising:

(a) a record medium, (b) one track containing a plurality of recordings along said medium, each of said recordings comprising a unique pattern of nonuniformly spaced spots arranged longitudinally along said track, each pattern being of longitudinal dimension D along said track, each of said patterns representing one bit of information, all spots in said patterns being of the same character, and applied successively to a reading means, (c) reading means for reading said patterns of spots in said track, said reading means comprising a facsimile of said patterns and of longitudinal dimension D, said reading means further comprising means to correlate said patterns on said track with said facsimile, (d) the minimum longitudinal spacing of the separate patterns of said plurality of patterns along said track being $d$ where $d$ is the minimum distance of traverse of said track past said reading means to read a single bit and is less than D so that successive patterns partially overlap each other along said track, said dimension $D=kd$ where $k$ is at least 2, and (e) means to relatively move said record medium and said reading means in the direction along said track, such that a peak correlation value for any given pattern occurs in only one relative position.

2. Apparatus as in claim 1 including means to read said record medium optically.

3. Apparatus as in claim 2 in which said medium is photographic.

4. Apparatus as in claim 2 in which said medium is electrographic.

5. Apparatus as in claim 2 in which said reading means comprises an optical correlator.

6. Apparatus as in claim 2 including means to read said record by means of light transmitted through said record.

7. Apparatus as in claim 2 including means to read said record by means of light reflected from said record.

8. Apparatus as in claim 1 in which said recording medium is magnetic.

9. Apparatus as in claim 1 in which said track of patterns is recorded on a strip recording medium adapted to be read while moving longitudinally.

10. Apparatus as in claim 1 in which said track of patterns is recorded on said medium as one of a plurality of parallel tracks adapted to be read while said record medium is stationary.

11. Apparatus as in claim 1 including means to read the spots of said pattern simultaneously.

12. Apparatus as in claim 1 including means to read the spots of said pattern sequentially to provide an electrical signal counterpart of said pattern.

13. Apparatus as in claim 12 including means to correlate said counterpart signal with a facsimile of said recorded pattern of spots.

14. Apparatus as in claim 13 in which said correlation is carried out in a delay line correlator.

15. Apparatus as in claim 1 in which all patterns in said track are similar.

16. Apparatus as in claim 1 in which succeeding patterns of spots in said track are different from preceding patterns of spots.

17. Apparatus as in claim 1 in which said record is read by being traversed past said reading means and including at least two parallel contiguous linear tracks of patterns, the patterns in one track being of a first form and the patterns in the other track being of a second form, different from said first form, and in which said pattern reading means comprises a line of detectors placed transversely to the direction of said tracks, there being more detectors than there are tracks.

18. Apparatus as in claim 17 in which said detectors are adapted to read the patterns in both tracks.

19. Apparatus as in claim 18 in which said detectors are point detectors reading optical patterns sequentially by converting them to electrical signals and including correlating means to detect both patterns.

20. Apparatus as in claim 1 in which said pattern is a swept frequency signal.

21. Apparatus as in claim 1 in cluding means to place guide indicia on said record medium, said indicia comprising index areas corresponding to each track and to each pattern in said tracks.

22. An information system as in claim 1 including means to record said patterns on said track.

23. Apparatus as in claim 22 in which said medium is graphic.

24. Apparatus as in claim 22 in which said medium is magnetic.

25. Apparatus as in claim 22 including means for recording each spot in said pattern simultaneously on said record.

26. Apparatus as in claim 22 including means for recording each spot in said pattern sequentially on said record.

References Cited

UNITED STATES PATENTS

| | | | |
|---|---|---|---|
| 3,064,519 | 11/1962 | Shelton | 340—146.3X |
| 3,111,645 | 11/1963 | Milford | 340—146.3 |
| 3,158,846 | 11/1964 | Silverman | 340—174.1 |
| 3,305,669 | 2/1967 | Fan | 340—173UX |
| 3,317,713 | 5/1967 | Wallace | 340—173UX |
| 3,325,789 | 6/1967 | Glenn | 340—173 |
| 3,392,400 | 7/1968 | Lamberts et al. | 340—173UX |
| 3,427,586 | 2/1969 | Lohmann | 340—146.3 |

MAYNARD R. WILBUR, Primary Examiner

L. H. BOUDREAU, Assistant Examiner

U.S. Cl. X.R.

340—173, 174.1